(12) United States Patent
Liao et al.

(10) Patent No.: US 8,873,182 B2
(45) Date of Patent: Oct. 28, 2014

(54) MULTI-PATH DATA PROCESSING SYSTEM

(75) Inventors: Yu Liao, Longmont, CO (US); Haitao Xia, San Jose, CA (US); Jun Xiao, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 120 days.

(21) Appl. No.: 13/445,878

(22) Filed: Apr. 12, 2012

(65) Prior Publication Data

US 2013/0235484 A1    Sep. 12, 2013

Related U.S. Application Data

(60) Provisional application No. 61/609,242, filed on Mar. 9, 2012.

(51) Int. Cl.
*G11B 5/09* (2006.01)

(52) U.S. Cl.
USPC .............................................. 360/53

(58) Field of Classification Search
None
See application file for complete search history.

(56) References Cited

U.S. PATENT DOCUMENTS

| | | | |
|---|---|---|---|
| 3,909,843 A * | 9/1975 | Wray | 360/27 |
| 4,742,532 A * | 5/1988 | Walker | 375/277 |
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |
| 5,392,299 A | 2/1995 | Rhines | |
| 5,417,500 A | 5/1995 | Martinie | |
| 5,513,192 A | 4/1996 | Janku | |
| 5,523,903 A | 6/1996 | Hetzler | |
| 5,535,245 A * | 7/1996 | Kim | 375/261 |
| 5,550,810 A | 8/1996 | Monogioudis et al. | |
| 5,550,870 A | 8/1996 | Blaker | |
| 5,612,964 A | 3/1997 | Haraszti | |
| 5,680,380 A * | 10/1997 | Taguchi et al. | 369/47.35 |
| 5,710,784 A | 1/1998 | Kindred | |
| 5,717,706 A | 2/1998 | Ikeda | |
| 5,724,396 A * | 3/1998 | Claydon et al. | 375/355 |
| 5,729,517 A * | 3/1998 | Fujiwara et al. | 369/59.22 |
| 5,802,118 A | 9/1998 | Bliss | |
| 5,844,945 A | 12/1998 | Nam | |
| 5,898,710 A | 4/1999 | Amrany | |
| 5,923,713 A | 7/1999 | Hatakeyama | |

(Continued)

OTHER PUBLICATIONS

Axvig et al., "Average Min-Sum Decoding of LDPC Codes", 5th International Symposium on Turbo Codes and Related Topics (2008).

(Continued)

*Primary Examiner* — Peter Vincent Agustin
(74) *Attorney, Agent, or Firm* — Hamilton DeSanctis & Cha (57) ABSTRACT

Various embodiments of the present invention provide apparatuses and methods for processing data in a multi-path data processing circuit. For example, an apparatus is disclosed that includes a first filter operable to process a first digital data stream to yield a first filtered digital data stream, a second filter operable to process a second digital data stream to yield a second filtered digital data stream, wherein the first and second digital data stream are representative of a same data set and wherein the first and second digital data stream have a different phase, a combining circuit operable to combine the first filtered digital data stream and the second filtered digital data stream to yield a combined data stream, and a data detector operable to detect a data sequence in the combined data stream.

20 Claims, 3 Drawing Sheets

(56) References Cited

U.S. PATENT DOCUMENTS

| | | | |
|---|---|---|---|
| 5,978,414 A | 11/1999 | Nara | |
| 5,983,383 A | 11/1999 | Wolf | |
| 6,005,897 A | 12/1999 | McCallister et al. | |
| 6,023,783 A | 2/2000 | Divsalar | |
| 6,029,264 A | 2/2000 | Kobayashi | |
| 6,065,149 A | 5/2000 | Yamanaka | |
| 6,097,764 A | 8/2000 | McCallister | |
| 6,145,110 A | 11/2000 | Khayrallah | |
| 6,216,249 B1 | 4/2001 | Bliss | |
| 6,216,251 B1 | 4/2001 | McGinn | |
| 6,249,559 B1* | 6/2001 | Jun | 375/376 |
| 6,266,795 B1 | 7/2001 | Wei | |
| 6,317,472 B1 | 11/2001 | Choi | |
| 6,351,832 B1 | 2/2002 | Wei | |
| 6,377,610 B1 | 4/2002 | Hagenauer | |
| 6,381,726 B1 | 4/2002 | Weng | |
| 6,473,878 B1 | 10/2002 | Wei | |
| 6,535,553 B1 | 3/2003 | Limberg et al. | |
| 6,625,775 B1 | 9/2003 | Kim | |
| 6,741,533 B1* | 5/2004 | Hiratsuka et al. | 369/44.41 |
| 6,748,034 B2 | 6/2004 | Hattori | |
| 6,757,862 B1 | 6/2004 | Marianetti, II | |
| 6,785,863 B2 | 8/2004 | Blankenship | |
| 6,810,502 B2 | 10/2004 | Eidson | |
| 6,970,511 B1 | 11/2005 | Barnette | |
| 6,986,098 B2 | 1/2006 | Poeppelman | |
| 7,047,474 B2 | 5/2006 | Rhee | |
| 7,058,873 B2 | 6/2006 | Song | |
| 7,073,118 B2 | 7/2006 | Greenberg | |
| 7,093,179 B2 | 8/2006 | Shea | |
| 7,117,427 B2 | 10/2006 | Ophir | |
| 7,133,228 B2 | 11/2006 | Fung | |
| 7,184,486 B1 | 2/2007 | Wu | |
| 7,191,378 B2 | 3/2007 | Eroz | |
| 7,203,149 B1* | 4/2007 | Sano | 369/59.11 |
| 7,203,887 B2 | 4/2007 | Eroz | |
| 7,308,061 B1 | 12/2007 | Huang | |
| 7,310,768 B2 | 12/2007 | Eidson | |
| 7,313,750 B1 | 12/2007 | Feng | |
| 7,370,258 B2 | 5/2008 | Iancu | |
| 7,415,651 B2 | 8/2008 | Argon | |
| 7,502,189 B2 | 3/2009 | Sawaguchi | |
| 7,523,375 B2 | 4/2009 | Spencer | |
| 7,587,657 B2 | 9/2009 | Haratsch | |
| 7,590,168 B2 | 9/2009 | Raghavan | |
| 7,646,829 B2 | 1/2010 | Ashley | |
| 7,702,986 B2 | 4/2010 | Bjerke | |
| 7,710,673 B2* | 5/2010 | Nakagawa et al. | 360/39 |
| 7,733,592 B2* | 6/2010 | Hutchins et al. | 360/51 |
| 7,752,523 B1 | 7/2010 | Chaichanavong | |
| 7,779,325 B2 | 8/2010 | Song | |
| 7,802,172 B2 | 9/2010 | Vila Casado et al. | |
| 7,952,824 B2 | 5/2011 | Dziak | |
| 7,958,425 B2 | 6/2011 | Chugg | |
| 7,996,746 B2 | 8/2011 | Livshitz | |
| 8,018,360 B2 | 9/2011 | Nayak | |
| 8,201,051 B2 | 6/2012 | Tan | |
| 8,237,597 B2 | 8/2012 | Liu | |
| 8,261,171 B2 | 9/2012 | Annampedu | |
| 8,291,284 B2 | 10/2012 | Savin | |
| 8,295,001 B2 | 10/2012 | Liu | |
| 8,355,470 B1* | 1/2013 | Mason et al. | 375/332 |
| 2002/0060869 A1* | 5/2002 | Sawaguchi et al. | 360/46 |
| 2002/0093908 A1* | 7/2002 | Yeap | 370/201 |
| 2003/0058767 A1* | 3/2003 | Han et al. | 369/53.2 |
| 2004/0032683 A1* | 2/2004 | Ashley et al. | 360/46 |
| 2008/0069373 A1 | 3/2008 | Jiang | |
| 2008/0304558 A1 | 12/2008 | Zhu et al. | |
| 2009/0132893 A1 | 5/2009 | Miyazaki | |
| 2009/0185643 A1 | 7/2009 | Fitzpatrick | |
| 2011/0057824 A1* | 3/2011 | Kulchycki | 341/143 |
| 2011/0167227 A1 | 7/2011 | Yang | |
| 2011/0264987 A1 | 10/2011 | Li | |
| 2012/0124118 A1 | 5/2012 | Ivkovic | |
| 2012/0182643 A1 | 7/2012 | Zhang | |
| 2012/0207201 A1 | 8/2012 | Xia | |
| 2012/0212849 A1 | 8/2012 | Xu | |
| 2012/0262814 A1 | 10/2012 | Li | |
| 2012/0265488 A1 | 10/2012 | Sun | |
| 2013/0106637 A1* | 5/2013 | Liao et al. | 341/155 |
| 2013/0235484 A1* | 9/2013 | Liao et al. | 360/39 |

OTHER PUBLICATIONS

Bahl et al., "Optimal decoding of linear codes for minimizing symbol error rate", IEEE Trans. Inform. Theory, vol. 20, pp. 284-287 (Mar. 1974).

Blaum, "High-Rate Modulation Codes for Reverse Concatenation", IEEE Transactions on Magnetics, vol. 43, No. 2 (Feb. 2007).

Casado et al., Multiple-rate low-density parity-check codes with constant blocklength, IEEE Transations on communications, Jan. 2009, vol. 57, pp. 75-83.

Cui et al., "High-Throughput Layered LDPC Decoding Architecture", IEEE Transactions on Very Large Scale Integration (VLSI) Systems, vol. 17, No. 4 (Apr. 2009).

Fan et al., "Constrained coding techniques for soft iterative decoders" Proc. IEEE Global Telecommun. Conf., vol. 1 b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan. 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

Spagnol et al, "Hardware Implementation of GF(2m) LDPC Decoders", IEEE Transactions on Circuits and Systemsši: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

Todd et al., "Enforcing maximum-transition-run code constraints and low-density parity check decoding", IEEE Trans. Magn., vol. 40, No. 6, pp. 3566-3571 (Nov. 2004).

U.S. Appl. No. 13/227,416, Unpublished (filed Sep. 7, 2011) (Lei Chen).

U.S. Appl. No. 13/213,751, Unpublished (filed Aug. 19, 2011) (Fan Zhang).

(56) References Cited

OTHER PUBLICATIONS

U.S. Appl. No. 13/340,951, Unpublished (filed Dec. 30, 2011) (Lei Chen).
U.S. Appl. No. 13/300,078, Unpublished (filed Nov. 18, 2011) (Chung-Li Wang).
U.S. Appl. No. 13/305,551, Unpublished (filed Nov. 28, 2011) (Yang Han).
U.S. Appl. No. 13/296,022, Unpublished (filed Nov. 14, 2011) (Victor Krachkovsky).
U.S. Appl. No. 13/180,495, Unpublished (filed Jul. 11, 2011) (Chung-Li Wang).
U.S. Appl. No. 13/174,537, Unpublished (filed Jun. 30, 2011) (Anantha Raman Krishnan).
U.S. Appl. No. 13/340,974, Unpublished (filed Dec. 30, 2011) (Dan Liu).
U.S. Appl. No. 13/369,468, Unpublished (filed Feb. 9, 2012) (Zongwang Li).
U.S. Appl. No. 13/174,453, Unpublished (filed Jun. 30, 2011) (Johnson Yen).
U.S. Appl. No. 13/302,119, Unpublished (filed Nov. 22, 2011) (Lei Chen).
U.S. Appl. No. 13/113,219, Unpublished (filed May 23, 2011) (Yang Han).
U.S. Appl. No. 13/283,549, Unpublished (filed Oct. 27, 2011) (Wu Chang).
U.S. Appl. No. 13/227,544, Unpublished (filed Sep. 8, 2011) (Shaohua Yang).
U.S. Appl. No. 13/284,767, Unpublished (filed Oct. 28, 2011) (Fan Zhang).
U.S. Appl. No. 13/362,409, Unpublished (filed Jan. 31, 2012) (Fan Zhang).
U.S. Appl. No. 13/305,510, Unpublished (filed Nov. 28, 2011) (Lei Chen).
U.S. Appl. No. 13/372,580, Unpublished (filed Feb. 14, 2012) (Fan Zhang).
U.S. Appl. No. 13/422,986, Unpublished (filed Mar. 16, 2012) (Fan Zhang).
U.S. Appl. No. 13/433,693, Unpublished (filed Mar. 29, 2012) (Fan Zhang).
U.S. Appl. No. 13/171,615, Unpublished (filed Jun. 29, 2011) (Bradley D. Seago).
U.S. Appl. No. 13/426,714, Unpublished (filed Mar. 22, 2012) (Shaohua Yang).
U.S. Appl. No. 13/363,751, Unpublished (filed Feb. 1, 2012) (Lei Chen).
U.S. Appl. No. 13/186,234, Unpublished (filed Jul. 19, 2011) (Haitao Xia).
U.S. Appl. No. 13/412,520, Unpublished (filed Mar. 5, 2012) (Fan Zhang).
U.S. Appl. No. 13/269,852, Unpublished (filed Oct. 10, 2011) (Haitao Xia).
U.S. Appl. No. 13/316,858, Unpublished (filed Dec. 12, 2011) (Zongwang Li).
U.S. Appl. No. 13/295,150, Unpublished (filed Nov. 14, 2011) (Zongwang Li).
U.S. Appl. No. 13/316,741, Unpublished (filed Dec. 12, 2011) (Yang Han).
U.S. Appl. No. 13/327,279, Unpublished (filed Dec. 15, 2011) (Wei Feng).
U.S. Appl. No. 13/269,832, Unpublished (filed Oct. 10, 2011) (Haitao Xia).
U.S. Appl. No. 13/239,683, Unpublished (filed Sep. 22, 2011) (Changyou Xu).
U.S. Appl. No. 13/284,730, Unpublished (filed Oct. 28, 2011) (Fan Zhang).
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "Block-LDPC: A Practical LDPC Coding System Design Approach", IEEE Trans. on Circuits, Regular Papers, vol. 5, No. 4, pp. 766-775, Apr. 2005.

* cited by examiner

MULTI-PATH DATA PROCESSING SYSTEM

CROSS REFERENCE TO RELATED APPLICATIONS

The present application claims priority to (is a non-provisional of) U.S. Pat. App. No. 61/609,242, entitled "Multi-Path Data Processing System", and filed Mar. 9, 2012 by Liao et al, the entirety of which is incorporated herein by reference for all purposes.

BACKGROUND

Various products including hard disk drives utilize a read channel device to retrieve information from a medium and decode and convert the information to a digital data format. Such read channel devices may include data processing systems including an analog to digital converter along with a data detector circuit. The ability to detect the original stored data patterns in the received data samples from the analog to digital converter is important to the accurate transfer of data.

The push toward low-cost, high-performance data transfer systems is resulting in tight constraints on latency and power dissipation of the read channel circuits. At the same time, there is a corresponding push to transfer higher density data patterns. This often requires detection of transferred data in a reduced signal to noise ratio environment. In this environment, current data processing circuits may not offer sufficient speed or accuracy.

Thus, for at least the aforementioned reason, there exists a need in the art for data processing systems with improved data detection.

BRIEF SUMMARY

Various embodiments of the present invention provide apparatuses and methods for processing data in a multi-path data processing circuit, and more particularly in a data processing circuit with multiple digital data streams representing an analog signal with different phases which are filtered, combined and detected. For example, an apparatus is disclosed that includes a first filter operable to process a first digital data stream to yield a first filtered digital data stream, a second filter operable to process a second digital data stream to yield a second filtered digital data stream, wherein the first and second digital data stream are representative of a same data set and wherein the first and second digital data stream have a different phase, a combining circuit operable to combine the first filtered digital data stream and the second filtered digital data stream to yield a combined data stream, and a data detector operable to detect a data sequence in the combined data stream. In some embodiments, multiple analog to digital converters are included to sample an analog signal at different phases to yield the first and second digital data streams. In other embodiments, a single analog to digital converter is included to sample the analog converter and yield the first digital data stream, with an interpolator included to generate the second digital data stream based on the first digital data stream and with a different phase. Various embodiments may also include weighting circuits to scale the filtered digital data streams, either before or after they are combined.

Some embodiments provide a method of processing data in a multi-path data processing system, including filtering a first digital data stream to yield a first filtered digital data stream and filtering a second digital data stream to yield a second filtered digital data stream, where the first and second digital data streams are representative of an analog data stream, and the first and second digital data streams have different phases. The method also includes combining the first filtered data stream and the second filtered data stream to yield a combined data stream, and performing a data detection operation on the combined data stream to detect data values for the analog data stream. In some cases, the method also includes applying weighting factors to the first and second filtered digital data streams before combining them to yield the combined data stream. The first and second digital data streams may be generated with different phases from an analog signal using multiple analog to digital converters, or using an interpolator. In some instances, the digital data streams are filtered differently.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

Various embodiments of the present invention provide apparatuses and methods for processing data in a multi-path data processing circuit, and more particularly in a data processing circuit with multiple digital data streams representing an analog signal with different phases which are filtered and combined. Sequence detection in the resulting digital data stream is improved in band limited channels. The use of multiple data paths that are sampled or interpolated at different phases enables different processing techniques to be applied before combining the data streams. In various embodiments one or more different processing techniques may be applied to the multiple data paths, including different equalization filtering, partial response targets, noise predictive filtering, etc. Performing different processing techniques provides diversity that can result in different residual inter-symbol interference (ISI), different noise components and estimations for the same data sequence, improving the bit error rate (BER) in the combined digital data stream. The different processing techniques may be tailored to improve the sequence detection for the resulting combined digital data stream, for example reducing the sector failure rate (SFR) in magnetic storage systems such as hard disk drives which include the multi-path data processing system.

The multiple digital data streams may be obtained in any suitable manner, and several non-limiting example embodiments are disclosed herein. In one embodiment, multiple analog to digital converters (ADC) sample an analog data stream with different sampling phases. In some instances of this embodiment, each analog to digital converter oversamples the analog data stream with a predetermined sampling phase. Two or more analog to digital converters may be used to produce two or more diverse digital data streams, with uniform or equal phase differences between each neighboring digital data stream, or with non-uniform phase differences. In another embodiment a digital data stream is produced by one analog to digital converter, and the resulting digital data stream is processed to produce multiple digital data streams of different phases, for example using one or more interpolators. In some instances of this embodiment, the analog to digital converter generates a baud rate stream of samples and an interpolation filter (ITR) interpolates the baud rate stream of samples to another phase to yield a second baud rate stream of samples with a different phase.

Figure 1:
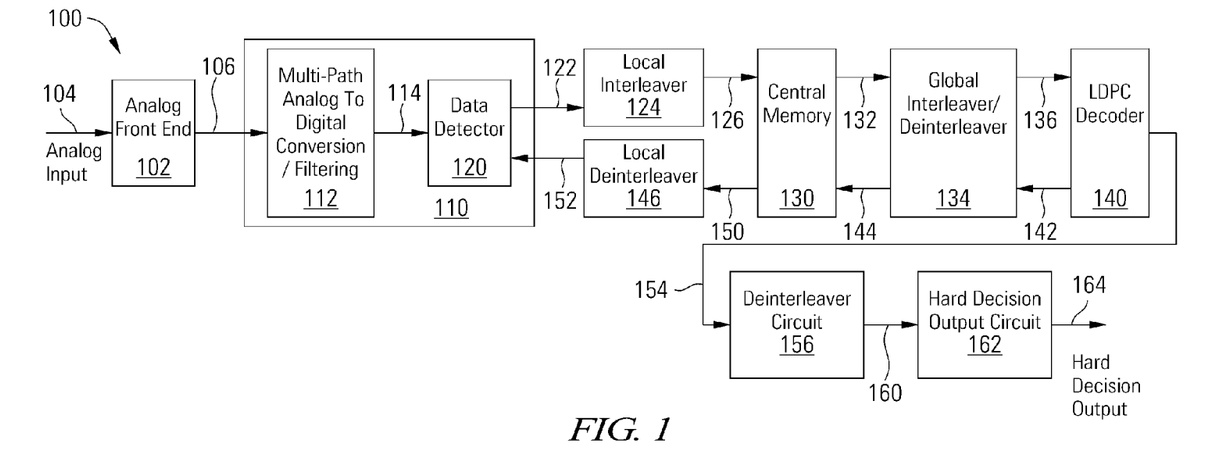
FIG. 1 depicts a read channel circuit including a multi-path data processing system in accordance with some embodiments of the present invention.
Figure 5:
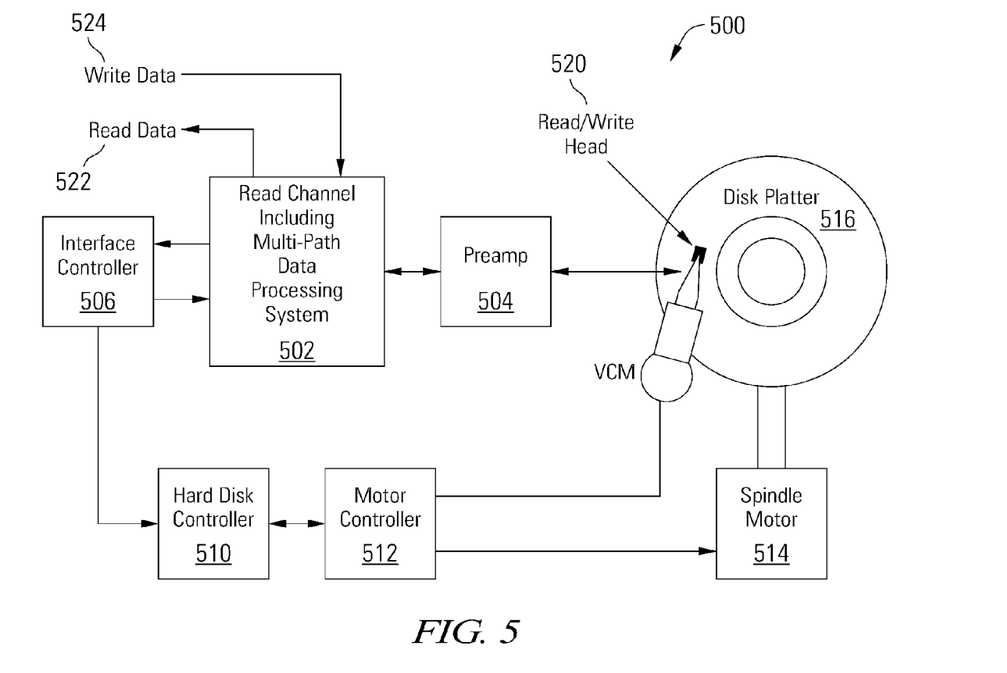
FIG. 5 depicts a storage system including a multi-path data processing system in accordance with some embodiments of the present invention.
Figure 6:
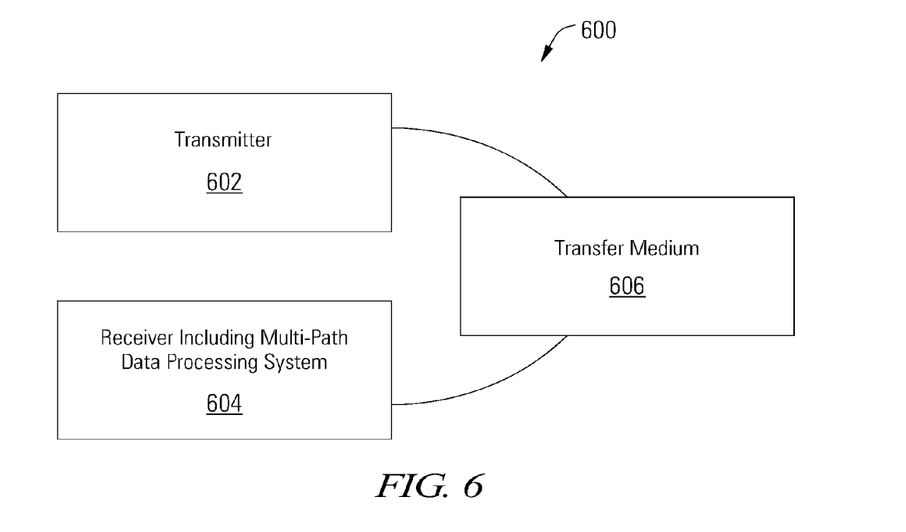
FIG. 6 depicts a wireless communication system including a multi-path data processing system in accordance with some embodiments of the present invention.

Turning to FIG. 1, a multi-path data processing system may be used for example in a read channel circuit 100 in a storage device or transmission system. Read channel circuit 100 includes an analog front end circuit 102 that receives an analog signal 104. Analog front end circuit 102 processes analog signal 104 and provides a processed analog signal 106 to the multi-path data processing system 110. Analog front end circuit 102 may include, but is not limited to, an analog filter and an amplifier circuit as are known in the art. Based upon the disclosure provided herein, one of ordinary skill in the art will recognize a variety of circuitry that may be included as part of analog front end circuit 102. In some cases, analog signal 104 is derived from a read/write head assembly that is disposed in relation to a storage medium as shown in FIG. 5. In other cases, analog signal 104 is derived from a receiver circuit that is operable to receive a signal from a transmission medium as shown in FIG. 6. The transmission medium may be wired or wireless. Based upon the disclosure provided herein, one of ordinary skill in the art will recognize a variety of source from which analog input 104 may be derived.

The multi-path data processing system 110 includes multi-path analog to digital conversion and filtering circuit 112, which as disclosed above, generates multiple digital data streams of different phases using any of a number of suitable techniques. For example, the multi-path analog to digital conversion and filtering circuit 112 may include, but is not limited to, multiple analog to digital converters sampling the processed analog signal 106 at different phases, or a single analog to digital converter and an interpolator as disclosed above. Based upon the disclosure provided herein, one of ordinary skill in the art will recognize a variety of devices and methods that may be used to generate multiple digital data streams of different phases representing processed analog signal 106. The multi-path analog to digital conversion and filtering circuit 112 also applies different processing techniques to the multiple digital data streams, including different equalization filtering, partial response targets, noise predictive filtering, etc. The processed digital data streams are combined in multi-path analog to digital conversion and filtering circuit 112, yielding a combined digital data stream 114 which is provided to a data detector circuit 120 in multi-path data processing system 110.

Data detector circuit 120 is operable to apply a data detection algorithm to a received codeword or data set, and in some cases data detector circuit 120 can process two or more codewords in parallel. In some embodiments of the present invention, data detector circuit 120 is a Viterbi algorithm data detector circuit as is known in the art. In other embodiments of the present invention, data detector circuit 120 is a maximum a posteriori data detector circuit as is known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention.

Upon completion, data detector circuit 120 provides detector output 122. Detector output 122 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 122 is provided to a local interleaver circuit 124. Local interleaver circuit 124 is operable to shuffle sub-portions (i.e., local chunks) of the data set included as detected output 122 and provides an interleaved codeword 126 that is stored to central memory circuit 130. Interleaver circuit 124 may be any circuit known in the art that is capable of shuffling data sets to yield a re-arranged data set. Interleaved codeword 126 is stored to central memory circuit 130.

Previously stored interleaved codewords 126 are accessed from central memory circuit 130 as a stored codeword 132 and globally interleaved by a global interleaver/deinterleaver circuit 134. Global interleaver/deinterleaver circuit 134 may be any circuit known in the art that is capable of globally rearranging codewords. Global interleaver/deinterleaver circuit 134 provides a decoder input 136 to a decoder such as a low density parity check (LDPC) decoder 140. Based upon the disclosure provided herein, one of ordinary skill in the art will recognize other data decoders that may be used in relation to different embodiments of the present invention.

Where the LDPC decoder 140 fails to converge (i.e., fails to yield the originally written data set) and a number of local iterations through LDPC decoder 140 exceeds a threshold, the resulting decoded output is provided as a decoded output 142 back to central memory circuit 130 where it is stored awaiting another global iteration through data detector circuit 120 and LDPC decoder 140. Prior to storage of decoded output 142 to central memory circuit 130, decoded output 142 is globally deinterleaved to yield a globally deinterleaved output 144 that is stored to central memory circuit 130. The global deinterleaving reverses the global interleaving earlier applied to stored codeword 132 to yield decoder input 136.

Once data detector circuit 120 is available, a previously stored deinterleaved output 144 is accessed from central memory circuit 130 and locally deinterleaved by a deinterleaver circuit 146. Deinterleaver circuit 146 rearranges decoder output 150 to reverse the shuffling originally performed by interleaver circuit 124. A resulting deinterleaved output 152 is provided to data detector circuit 120 where it is used to guide subsequent detection of a corresponding data set received as combined digital data stream 114.

Alternatively, where the decoded output converges (i.e., yields the originally written data set) in the LDPC decoder 140, the resulting decoded output is provided as an output codeword 154 to a deinterleaver circuit 156. Deinterleaver circuit 156 rearranges the data to reverse both the global and local interleaving applied to the data to yield a deinterleaved output 160. Deinterleaved output 160 is provided to a hard decision output circuit 162. Hard decision output circuit 162 is operable to re-order data sets that may complete out of order back into their original order. The originally ordered data sets are then provided as a hard decision output 164.

The multi-path data processing disclosed herein, when applied to a read channel as in FIG. 1 or to other iterative detection systems, may be performed during every global iteration or may be performed on a more limited basis, such as during only the first global iteration for a block of data.

Figure 2:
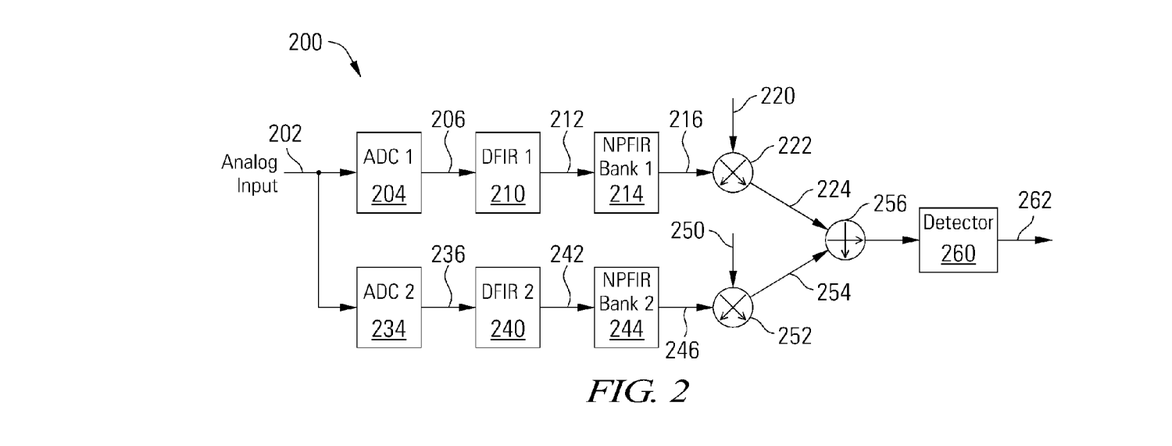
FIG. 2 depicts a multi-path data processing system with multiple oversampled data streams of different phases in accordance with some embodiments of the present invention.

Turning to FIG. 2, a multi-path data processing system 200 is depicted that includes multiple oversampled data streams of different phases in accordance with some embodiments of the present invention. The multi-path data processing system 200 includes multiple analog to digital converters 204 and 234 which sample an analog signal 202 with different sampling phases. Although the multi-path data processing system 200 depicted in FIG. 2 includes two analog to digital converters 204 and 234, the multi-path data processing system 200 is not limited to this number and may include more than two analog to digital converters and data paths. The use of multiple analog to digital converters 204 and 234 introduces diversity in the noise of samples in digital data streams 206 and 236. Analog to digital converters 204 and 234 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In some embodiments, analog to digital converters 204 and 234 have sampling frequencies at the baud rate, capturing two samples per clock cycle each. When the two resulting data paths are combined, this results in an effective sampling rate at twice the baud rate. In some embodiments, the analog to digital converters 204 and 234 have a phase distribution of 0 and 180 degrees. However, the analog to digital converters 204 and 234 are not limited to any particular sampling rate or phase distribution.

The analog to digital converter 204 provides a first digital data stream 206 to a digital finite impulse response (DFIR) filter 210, which acts as an equalizer on digital data stream 206. The digital finite impulse response filter 210 filters the digital data stream 206 by applying a mathematical operation to achieve any of a wide range of desired frequency responses. In some embodiments, the digital finite impulse response filter 210 passes the digital data stream 206 through a series of delay elements, multiplying the delayed signals X[n] by filter coefficients $F_n$ or tap weights, and summing the results according to an equation such as $Y[n]=F_0X[n]+F_1X[n-1]+F_2X[n-2]+ \ldots +F_3X[n-L]$ to yield a filtered output 212. The filtered output 212 is provided to a noise predictive finite impulse response (NPFIR) filter bank 214 to perform noise predictive filtering. The noise predictive finite impulse response filter bank 214 may be, but is not limited to, a bank of parallel digital finite impulse response filters applying different filter coefficients. Any noise predictive filter known in the art may be used. One example of a noise predictive filter is discussed in Kavcic et al., "A Signal-dependent Autoregressive Channel Model", IEEE Transactions on Magnetics, Vol. 35, September 1999, pp. 2316-2318. The entirety of the aforementioned reference is incorporated herein by reference for all purposes. Notably, the type and number of filters (e.g., 210 and 214) included in multi-path data processing system 200 are not limited to the example shown in FIG. 2.

The filtered output 216 from each filter of the NPFIR filter bank 214 is weighted or scaled by a weighting factor 220 in a scaling circuit 222, yielding a weighted data stream 224. The weighting factor 220 may be programmable or fixed, and may remain constant or may be varied during operation.

The second analog to digital converter 234 provides a second digital data stream 236 to a digital finite impulse response filter 240, which acts as an equalizer on digital data stream 236. As with the first digital finite impulse response filter 210, digital finite impulse response filter 240 filters the digital data stream 236 by applying a mathematical operation to achieve any of a wide range of desired frequency responses. The filtered output 242 is provided to a noise predictive finite impulse response filter bank 244 to perform noise predictive filtering. Again, any noise predictive filter known in the art may be used. Notably, either or both the digital finite impulse response filter 240 and noise predictive finite impulse response filter 244 may perform different filtering operations than digital finite impulse response filter 210 and noise predictive finite impulse response filter 214. For example, digital finite impulse response filter 240 may equalize the second digital data stream 236 to a different target than that of digital finite impulse response filter 210. In this example, the noise components of filtered output 212 and filtered output 242 will be different, while both representing the same analog signal 202. In other embodiments, the filtering may be the same in both data paths.

The filtered output 246 from each filter of the NPFIR filter bank 244 is weighted or scaled by a weighting factor 250 in a scaling circuit 252, yielding a weighted data stream 254. The weighting factor 250 may be programmable or fixed, and may remain constant or may be varied during operation. In some embodiments, the weighting factors 220 and 250 are both 0.5.

Again, the filtering applied in the multi-path data processing system 200 on the two digital data paths from analog to digital converters 204 and 234 is not limited to the example of FIG. 2. Any suitable data processing may be performed on the two digital data paths of different phases prior to combination of the data paths and sequence detection.

The weighted data streams 224 and 254 from the same data pattern are combined in combining circuit 256, which may be but is not limited to an adder circuit. The combining circuit 256 may operate bit by bit or may perform vector-based operations. The resulting combined data stream from combining circuit 256 is provided to a data detector 260. In some embodiments, the weighting and combining operations are performed in other orders or using other devices. For example, scaling circuits 222 and 252 may be replaced by a single scaling circuit located after the combining circuit 256, or the scaling may be omitted or performed in the analog to digital converters 204 and 234.

Again, the data detector 260 may be, but is not limited to, a Viterbi algorithm data detector or a maximum a posteriori data detector circuit or other trellis-based data detector, which yields soft decisions such as log likelihood ratio values at an output 262. The filtering performed in the multi-path data processing system 200 may be tailored in the two data paths based on the output 262 from the data detector 260. For example, an ideal response from the data detector 260 may be constructed and compared with each of the filtered outputs 212 and 242 from digital finite impulse response filters 210 and 240, respectively, to generate error signals which are used to adapt the filter coefficients of digital finite impulse response filters 210 and 240. The resulting filtering operations performed in the digital finite impulse response filters 210 and 240 may be different and customized to the error signals based on the phase diversity of the digital data streams 206 and 236, even though the ideal response target is the same. In other embodiments, different ideal response targets may be used to generate filter coefficients for digital finite impulse response filters 210 and 240.

Figure 3:
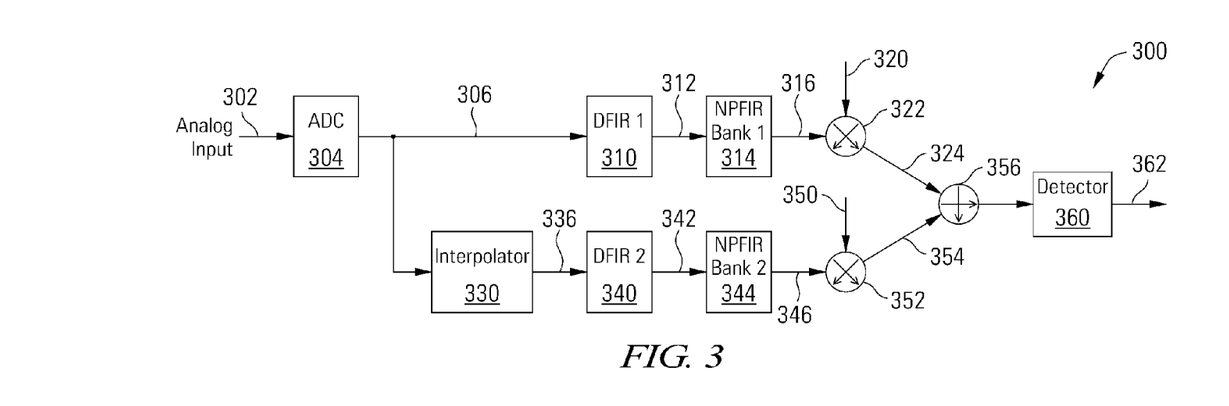
FIG. 3 depicts a multi-path data processing system with a baud rate stream that is interpolated to provide multiple data streams of different phases in accordance with some embodiments of the present invention.

Turning to FIG. 3, a multi-path data processing system 300 is depicted based on a baud rate stream that is interpolated to provide multiple data streams of different phases in accordance with some embodiments of the present invention. The multi-path data processing system 300 includes a single analog to digital converter 304 to sample an analog signal 302 and produce a digital data stream 306. (Other analog to digital converters may be included in some embodiments of the data processing system for other purposes.) Analog to digital converter 304 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In some embodiments, analog to digital converter 304 has a sampling frequency at the baud rate, capturing two samples per clock cycle.

The analog to digital converter 304 provides a first digital data stream 306 to a digital finite impulse response (DFIR) filter 310, which acts as an equalizer on digital data stream 306. The digital finite impulse response filter 310 filters the digital data stream 306 by applying a mathematical operation to achieve any of a wide range of desired frequency responses, for example equalizing the digital data stream 306 to an ideal response target. As disclosed above, the ideal response target may be used to generate an error signal by combining a feedback signal from a downstream component such as a detector with the filtered output 312 from the digital finite impulse response filter 310. The filtered output 312 is provided to a noise predictive finite impulse response (NPFIR) filter bank 314 to perform noise predictive filtering. Notably, the type and number of filters (e.g., 310 and 314) included in multi-path data processing system 300 are not limited to the example shown in FIG. 3.

The filtered output 316 from each filter in the noise predictive finite impulse response filter bank 314 is weighted or scaled by a weighting factor 320 in a scaling circuit 322, yielding a weighted data stream 324. The weighting factor 320 may be programmable or fixed, and may remain constant or may be varied during operation.

An interpolation filter 330 processes the digital data stream 306 from the analog to digital converter 304 to produce a second digital data stream 336, representing the analog signal 302 at a different phase than the first digital data stream 306. The interpolation filter 330 may generate the digital data stream 336 with any suitable phase relationship to digital data stream 306, for example 180 degrees.

The second digital data stream 336 is provided to a digital finite impulse response filter 340, which acts as an equalizer on digital data stream 336. As with the first digital finite impulse response filter 310, digital finite impulse response filter 340 filters the digital data stream 336 by applying a mathematical operation to achieve any of a wide range of desired frequency responses. The filtered output 342 is provided to a noise predictive finite impulse response filter bank 344 to perform noise predictive filtering. Again, any noise predictive filter known in the art may be used. Notably, either or both the digital finite impulse response filter 340 and noise predictive finite impulse response filter 344 may perform different filtering operations than digital finite impulse response filter 310 and noise predictive finite impulse response filter 314. For example, digital finite impulse response filter 340 may equalize the second digital data stream 336 to a different target than that of digital finite impulse response filter 310. In other embodiments, the filtering may be the same in both data paths.

The filtered output 346 from each filter in the noise predictive finite impulse response filter 344 is weighted or scaled by a weighting factor 350 in a scaling circuit 352, yielding a weighted data stream 354. The weighting factor 350 may be programmable or fixed, and may remain constant or may be varied during operation. In some embodiments, the weighting factors 320 and 350 are both 0.5.

Again, the filtering applied in the multi-path data processing system 300 on the two digital data paths from analog to digital converters 304 and 334 is not limited to the example of FIG. 3. Any suitable data processing may be performed on the two digital data paths of different phases prior to combination of the data paths and sequence detection.

The weighted data streams 324 and 354 from the same data pattern are combined in combining circuit 356, which may be but is not limited to an adder circuit. The combining circuit 356 may operate bit by bit or may perform vector-based operations. The resulting combined data stream from combining circuit 356 is provided to a data detector 360.

Again, the data detector 360 may be, but is not limited to, a Viterbi algorithm data detector or a maximum a posteriori data detector circuit or other trellis-based data detector, which yields soft decisions or likelihood values at an output 362. The filtering performed in the multi-path data processing system 300 may be tailored in the two data paths based on the output 362 from the data detector 360, for example, using an ideal response target at the output of data detector 360 to generate error signals which are used to adapt the filter coefficients of digital finite impulse response filters 310 and 340. The resulting filtering operations performed in the digital finite impulse response filters 310 and 340 may be different and customized to the error signals based on the phase diversity of the digital data streams 306 and 336, even though the ideal response target is the same. In other embodiments, different ideal response targets may be used to generate filter coefficients for digital finite impulse response filters 310 and 340.

The embodiment of FIG. 3 lacks the noise diversity introduced in the embodiment of FIG. 2 by multiple analog to digital converters, but provides the benefits of filtering and combining two data paths of different phases and may be smaller and less complex than the embodiment of FIG. 2. For example, to improve detection in a data detector 360 that is sensitive to high frequency noise, the digital finite impulse response filter 340 may have more high frequency attenuation compared to the digital finite impulse response filter 310, yielding less high frequency noise in filtered output 342 than in filtered output 312, and reducing the high frequency noise component in the combined data stream from combining circuit 356 that is provided to data detector 360. The embodiment of FIG. 2 provides additional noise independency in the digital data paths based on the use of multiple analog to digital converters. The embodiments of FIG. 2 and FIG. 3 may also shape the noise differently in the multiple digital data paths by performing different filtering operations in each digital data path.

Figure 4:
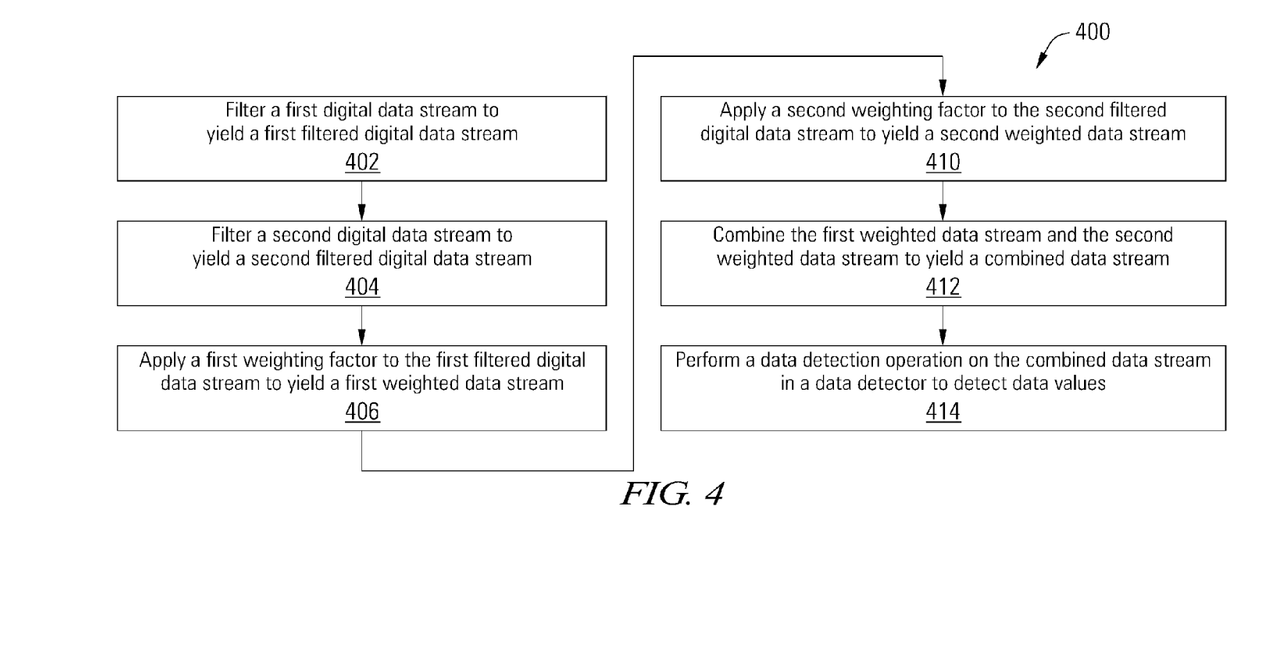
FIG. 4 is a flow diagram illustrating a method for processing data in a multi-path data processing system in accordance with some embodiments of the present invention.

Turning to FIG. 4, a flow diagram 400 depicts a method for processing data in a multi-path data processing system in accordance with various embodiments of the present invention. Following flow diagram 400, a first digital data stream is filtered to yield a first filtered digital data stream. (Block 402) A second digital data stream is filtered to yield a second filtered digital data stream. (Block 404) Any suitable filtering operations may be performed, such as the equalization disclosed above performed in a digital finite impulse filter or the filtering of a noise predictive digital finite impulse filter, or other filtering or data processing operations. The first and second digital data streams are representative of the same data set such as that in an analog data stream or from another single source, and the first and second digital data streams have different phases. The phase separation between the digital data streams may be equal, for example 180 degrees between two digital data streams, or may be unequal. The first and second digital data streams may be filtered in the same way or differently. A weighting factor is applied to the first filtered digital data stream to yield a first weighted data stream. (Block 406) A second weighting factor is applied to the second filtered digital data stream to yield a second weighted data stream. (Block 410) The weighting factors may be equal, for example applying a weighting factor of 0.5 to average two filtered digital data streams, or may be different. The weighted data streams are combined to yield a combined data stream. (Block 412) This may be accomplished, for example by adding the weighted data streams. The weighting and combining may be performed in that order in separate operations, or may be combined or performed in other orders, using any suitable device. A data detection operation is performed on the combined data stream in a data detector to detect data values, for example detecting data sequences on an analog data stream upon which the digital data streams are based. (Block 414)

Turning to FIG. 5, a storage system 500 is illustrated as an example application of a multi-path data processing system in accordance with some embodiments of the present invention. However, it is important to note that the multi-path data processing system disclosed herein is not limited to any particular application such as the storage system 500 of FIG. 5. The storage system 500 includes a read channel circuit 502 with a multi-path data processing system in accordance with some embodiments of the present invention. Storage system 500 may be, for example, a hard disk drive. Storage system 500 also includes a preamplifier 504, an interface controller 506, a hard disk controller 510, a motor controller 512, a spindle motor 514, a disk platter 516, and a read/write head assembly 520. Interface controller 506 controls addressing and timing of data to/from disk platter 516. The data on disk platter 516 consists of groups of magnetic signals that may be detected by read/write head assembly 520 when the assembly is properly positioned over disk platter 516. In one embodiment, disk platter 516 includes magnetic signals recorded in accordance with either a longitudinal or a perpendicular recording scheme.

In a typical read operation, read/write head assembly 520 is accurately positioned by motor controller 512 over a desired data track on disk platter 516. Motor controller 512 both positions read/write head assembly 520 in relation to disk platter 516 and drives spindle motor 514 by moving read/write head assembly 520 to the proper data track on disk platter 516 under the direction of hard disk controller 510. Spindle motor 514 spins disk platter 516 at a determined spin rate (RPMs). Once read/write head assembly 520 is positioned adjacent the proper data track, magnetic signals representing data on disk platter 516 are sensed by read/write head assembly 520 as disk platter 516 is rotated by spindle motor 514. The sensed magnetic signals are provided as a continuous, minute analog signal representative of the magnetic data on disk platter 516. This minute analog signal is transferred from read/write head assembly 520 to read channel circuit 502 via preamplifier 504. Preamplifier 504 is operable to amplify the minute analog signals accessed from disk platter 516. In turn, read channel circuit 502 decodes and digitizes the received analog signal to recreate the information originally written to disk platter 516. This data is provided as read data 522 to a receiving circuit. As part of decoding the received information, read channel circuit 502 processes the received signal using a multi-path data processing system. Such a multi-path data processing system may be implemented consistent with that disclosed above in relation to FIGS. 2-3. In some cases, the data processing may be performed consistent with the flow diagram disclosed above in relation to FIG. 4. A write operation is substantially the opposite of the preceding read operation with write data 524 being provided to read channel circuit 502. This data is then encoded and written to disk platter 516.

It should also be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 500, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Turning to FIG. 6, a wireless communication system 600 or data transmission device including a receiver 604 with a multi-path data processing system is shown in accordance with some embodiments of the present invention. Communication system 600 includes a transmitter 602 that is operable to transmit encoded information via a transfer medium 606 as is known in the art. The encoded data is received from transfer medium 606 by receiver 604. Receiver 604 incorporates a multi-path data processing system. Such a multi-path data processing system may be implemented consistent with that described above in relation to FIGS. 2-3. In some cases, the data processing may be done consistent with the flow diagram discussed above in relation to FIG. 4.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel apparatuses and methods for processing data in a multi-path data processing circuit. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for processing data, comprising:
   an interpolator operable to generate a second digital data stream based on a first digital data stream;
   a first filter operable to process the first digital data stream to yield a first filtered digital data stream;
   a second filter operable to process the second digital data stream to yield a second filtered digital data stream, wherein the first and second digital data stream are representative of a same data set and wherein the first and second digital data stream have a different phase;
   a combining circuit operable to combine the first filtered digital data stream and the second filtered digital data stream to yield a combined data stream; and
   a data detector operable to detect a data sequence in the combined data stream, wherein the data detector comprises a soft data output indicating a likelihood that the data sequence has been correctly detected.

2. The apparatus of claim 1, further comprising an analog to digital converter operable to sample an analog signal to yield the first digital data stream.

3. The apparatus of claim 1, wherein the first filter and the second filter apply different filter operations on the first digital data stream and the second digital data stream.

4. The apparatus of claim 1, further comprising:
   a first weighting circuit operable to scale the first filtered digital data stream; and
   a second weighting circuit operable to scale the second filtered digital data stream.

5. The apparatus of claim 1, wherein the first filter and the second filter comprise digital finite impulse response filters.

6. The apparatus of claim 1, wherein the first filter and the second filter comprise noise predictive digital finite impulse response filters.

7. The apparatus of claim 1, wherein the data detector comprises a trellis-based data detector operable to yield log likelihood ratio values.

8. The apparatus of claim 1, wherein the first filter, the second filter, the combining circuit and the data detector are implemented as an integrated circuit.

9. The apparatus of claim 1, wherein the apparatus is incorporated in a storage device.

10. The apparatus of claim 1, wherein the apparatus is incorporated in a storage system comprising a redundant array of independent disks.

11. The apparatus of claim 1, wherein the apparatus is incorporated in a transmission system.

12. A method for processing data, comprising:
   interpolating a first digital data stream to yield a second digital data stream;
   filtering the first digital data stream to yield a first filtered digital data stream;
   filtering the second digital data stream to yield a second filtered digital data stream, wherein the first and second digital data streams are representative of an analog data stream, and wherein the first and second digital data streams have different phases;
   combining the first filtered data stream and the second filtered data stream to yield a combined data stream; and
   performing a data detection operation on the combined data stream to detect data values for the analog data stream and to generate soft data representing a likelihood that the data values have been correctly detected.

13. The method of claim 12, further comprising applying a first weighting factor to the first filtered digital data stream and applying a second weighting factor to the second filtered digital data stream before combining the first filtered data stream and the second filtered data stream to yield the combined data stream.

14. The method of claim 12, wherein the first digital data stream and the second digital data stream are filtered differently.

15. The method of claim 12, further comprising sampling an analog signal in an analog to digital converter to yield the first digital data stream.

16. A storage system comprising:
   a storage medium maintaining a data set;
   a read/write head assembly operable to sense the data set on the storage medium and to provide an analog output corresponding to the data set;
   an analog to digital converter operable to sample the analog output to yield a first digital data stream;
   an interpolator operable to generate a second digital data stream based on the first digital data stream;
   a first filter operable to process the first digital data stream to yield a first filtered digital data stream;
   a second filter operable to process the second digital data stream to yield a second filtered digital data stream, wherein the first and second digital data stream are representative of the analog output and wherein the first and second digital data stream have a different phase;
   a combining circuit operable to combine the first filtered digital data stream and the second filtered digital data stream to yield a combined data stream; and
   a data detector operable to detect a data sequence in the combined data stream and to generate soft data representing a likelihood that the data sequence was correctly detected.

17. The storage system of claim 16, wherein the first filter and the second filter comprise digital finite impulse response filters.

18. The storage system of claim 16, wherein the first filter and the second filter comprise noise predictive digital finite impulse response filters.

19. The storage system of claim 16, wherein the data detector comprises a trellis-based data detector operable to yield log likelihood ratio values.

20. The storage system of claim 16, further comprising:
a first weighting circuit operable to scale the first filtered digital data stream; and
a second weighting circuit operable to scale the second filtered digital data stream.

* * * * *